United States Patent Office 3,712,875
Patented Jan. 23, 1973

3,712,875
SYNERGISTIC ADDITIVE SYSTEM FOR
ANTI-FOG VINYL FILM
Donatas Tijunelis, Buffalo Grove, Ill., assignor to Union
Carbide Corporation, New York, N.Y.
No Drawing. Continuation-in-part of application Ser. No.
853,981, Aug. 28, 1969, which is a continuation-in-part
of abandoned application Ser. No. 632,895, Apr. 24,
1967. This application Feb. 22, 1971, Ser. No. 117,843
Int. Cl. C08f 21/04
U.S. Cl. 260—23 EP                                    11 Claims

ABSTRACT OF THE DISCLOSURE

An anti-fog additive system comprising a mixture of two, select, anti-fog additives is incorporated into a thermoplastic film thereby substantially reducing and eliminating the fogging effect in said film.

---

This application is a continuation-in-part of U.S. Ser. No. 853,981, filed Aug. 28, 1969, now abandoned which is a continuation-in-part of U.S. Ser. No. 632,895, filed Apr. 24, 1967 and now abandoned.

The present invention relates to an additive system for use in enhancing the anti-fog properties of thermoplastic films. More particularly, the present invention relates to the use of an additive system which has a synergistic affect in enhancing the anti-fog properties of thermoplastic films.

The packaging of fresh food products, particularly fresh meats, with clear, thermoplastic films has given rise to the problem of film fogging created by the changes in temperature in the display cases where the thusly packaged fresh food products are placed. These temperature changes cause moisture to form and collect on the inner surface of the films thereby "fogging" the film and detracting from its utility as a see-through wrapper for the food products packaged therein.

Prior attempts to decrease or eliminate the fogging tendency of these films have been directed to the use of surfactants applied either as film coatings or as additives in the resin formulations from which the films are subsequently extruded. Typical of the surfactants which have been employed for this purpose are such materials as polyoxyethylene (20) sorbitan monooleate, which has been generally utilized in connection with plasticized polyvinyl chloride films, glycerol monooleate, which has been particularly well suited for use in connection with polyethylene films, glyceryl ethers of fatty acids, sorbitan esters of fat-forming fatty acids, and the like. The manner in which some of these additives have been utilized to reduce fogging in various films is exemplified by the disclosures of U.S. Pat. 3,048,266 and U.S. Pat. 3,048,265 both to Hackhel et al.

While these additives have achieved some degree of success in reducing the fogging effect in the various thermoplastic films with which they have been employed, they have not been particularly effective in reducing the fogging effect of tacky, highly plasticized polyvinyl chloride films. It is an object of the present invention, therefore, to provide an additive system which will substantially reduce and eliminate the fogging effect of clear, tacky, highly plasticized polyvinyl chloride films.

This and further objects of the present invention will be more fully comprehended when considered in light of the ensuing description thereof.

It has now been found that the objects of the present invention can be generally accomplished by incorporating into the resin formulation, for which a plasticized polyvinyl chloride film is subsequently obtained, an anti-fog additive system comprising a mixture of two, particularly selected anti-frog additives.

The types of films in which the anti-fog additive system of the present invention can be incorporated are those which are obtainable from the extrusion of such resins as polyvinyl chloride homopolymers and polyvinyl chloride copolymers containing at least about 70 percent by weight, based on the total weight of the monomers, of vinyl chloride. Examples of useful copolymers are copolymers of vinyl chloride with up to about 30 percent of an olefinically unsaturated compound such as vinyl andor acrylic compounds which are copolymerizable with vinyl chloride. In particular, up to 30 percent of a vinyl ester of a lower alkanoic acid such as vinyl acetate may be employed as an olefinically unsaturated compound copolymerizable with vinyl chloride.

Surprisingly, it has been found that a synergistic anti-fog additive system in accordance with the present invention is obtained from a mixture of components comprising the compounds polyoxyethylene (20) sorbitan monooleate, commercially available under the trade name "Tween 80," and sorbitan monostearate, commercially available under the trade name "Span 60" in an approximate 1:1 ratio by weight.

In lieu of using sorbitan monostearate, it has also been found that the compound sorbitan monooleate can be readily substituted therefor as an equivalent thereof and the same synergistic anti-fogging results will be obtained in the film. Hence, although the present invention is described with particular reference to primarily the use of sorbitan monostearate as one of the anti-fog additives, it should be understood that further reference thereto includes the use of sorbitan monooleate as a substitute for sorbitan monostearate to the same extent and with the same degree of effectiveness.

The anti-fog additives of the present invention can be incorporated in the resin formulation in an approximate 1:1 ratio and in combined amounts ranging from about 2.0 to about 8.0 parts by weight per hundred parts by weight of resin employed. A synergistic effect is observed in the anti-fog additive system so long as the approximate 1:1 ratio of additives is observed and the total amount of additive present is at least about 2.0 parts per hundred. If the total concentration of anti-fog additives present exceeds 8.0 parts per hundred no appreciable enhancement of anti-fog properties is obtained. The preferred range of anti-fog additives is a total concentration of from about 2.0 to about 4.0 parts per hundred. Further reference throughout this application and in the appended claims to the term "parts per hundred" should be understood as and is intended to refer to parts by weight per 100 parts by weight of the resin employed.

The resins into which the anti-fog additive system of the present invention can be incorporated are plasticized polyvinyl chloride homopolymers or plasticized polyvinyl chloride copolymers which may contain the usual amounts of stabilizers and lubricants. Such resins will usually contain from about 20 to about 65 parts per hundred plasticizer and preferably will contain from between about 20 to about 40 parts per hundred of primary plasticizer with the balance being one or more secondary plasticizers. Hence, it should be understood that the term "plasticized" as used throughout this application and in the appended claims is intended to refer to resins or films containing from between about 20 to about 65 parts per hundred of plasticizer.

Generally, the plasticized polyvinyl chloride film obtained exhibits a high clarity (haze, less than 3.0% as determined by ASTM D1003–52), is tacky (blocking force, more than 8.0 grams per inch), is elastic (elongation at break, more than 200%) and has a thickness of up to about 1.5 mils.

A typical composition of a plasticized polyvinyl chloride resin formulation having the anti-fog additive system of the present invention incorporated therein is set forth in Table I below wherein the concentration of each component is expressed in parts per hundred and a generally acceptable range of each component employed is compared with a generally preferred range of each component employed.

TABLE I.—RESIN FORMULATION

| Component | Concentration (parts/100) | |
|---|---|---|
| | General formulation range | Preferred formulation range |
| Resin, polyvinyl chloride homopolymer, inherent viscosity 0.8–1.4 dl./gm | 100 | 100 |
| Primary plasticizer, di(2-ethylhexyladipate) | 20–40 | 29–35 |
| Secondary plasticizer, epoxidized soybean oil | 0–15 | 5–15 |
| Primary stabilizer, a commercially obtained organometallic (calcium-zinc) type stabilizer | 1–4 | 3 |
| Secondary stabilizer, a commercially obtained organic chelator | 0–3 | 2 |
| Lubricant, N,N-distearyl ethylene diamine | 0–2 | 0.5 |
| Anti-fog system additive: | | |
| (1) Polyoxyethylene (20) sorbitan monooleate | 1.0–4.0 | 2.0 |
| (2) Sorbitan monostearate | 1.0–4.0 | 2.0 |

Typical conditions under which the resins of the present invention may be extruded and the test methods utilized to determine and measure their anti-fog characteristics are set forth hereinbelow.

EXTRUSION CONDITIONS AND TEST METHODS

(A) Extrusion conditions

Plasticized polyvinyl chloride films were obtained wherein the components employed fell within the preferred range of the resin formulation set forth in Table I above. The line conditions under which the resins were extruded and the range of physical dimensions of the plasticized polyvinyl chloride films subsequently obtained therefrom are set forth in Table II below.

TABLE II.—EXTRUSION LINE CONDITIONS

Dry blend temperature of components ____ 125° F.–135° F.
Total dry blend time (minutes) ____ 120–180.
Density of dry blend (lbs./cu. ft.) ____ 20–30.
Type of blender ____ Sigma Blade.
Average extrusion barrel temperature ____ 320° F.–350° F.
Average extrusion die temperature ____ 380° F.–430° F.
Extruder size (barrel diameter) ____ 2½ inches.
Die size (diameter) ____ 4–6 inches.
Die lip opening (mils) ____ 17–20.
Average film production (lbs./hr.) ____ 30–40.
Flat width of film ____ 14–18 inches.
Film thickness (mils) ____ 0.5–1.0.

(B) Determination of film clarity

From the plasticized polyvinyl chloride films obtained, samples were taken to cover four-ounce glass jars which contained water. The jars were filled to within one inch of their tops with water which was at room temperature. The covered jars were then placed in a cooler which was maintained at a temperature of from between about 40° F.–42° F. for a predetermined period after which they were removed and the film samples on the jars were then rated for clarity. The basis upon which the clarity ratings were obtained was derived by assigning an arbitrary numerical value to each film sample depending upon the viewer's ability to see through the sample. The numerical values assigned ranged from 0 to 4 corresponding to the clarity of the film. These numerical values are further described in Table III below, wherein use of the term "full drops" refers to a drop of water ready to fall and the term "color" refers to the color of the glass jars, as viewed through the film samples.

TABLE III.—NUMERICAL CLARITY RATING OF FILM SAMPLES

| Rating | Degree of transparency | Film fog condition |
|---|---|---|
| 4 | No see through of color or outline | Fine fog having a silvery color. |
| 3 | Translucent only with respect to color | Fine fog but no silvery color. |
| 2 | Distorted transparency | Small droplets; no full drops. |
| 1 | Good transparency with only slight distortion | Full drops interspersed in clear areas. |
| 0 | No interference | No drops; clear film. |

The following examples are set forth as being exemplary of the present invention and are not intended, in any manner, to be limitative thereof.

EXAMPLE 1

Several plasticized vinylchloride films were extruded, each film being obtained from the same resin formulation. The film formulations fell within the "preferred formulation range" of Table I above and comprised 100 parts polyvinyl chloride homopolymer resin having an inherent viscosity of from between about 0.8–1.0; 29 parts di(2-ethylhexyladipate); 5 parts epoxidized soybean oil; 3 parts of an organometallic (calcium-zinc) type stabilizer; 2 parts of an organic chelator; and 0.5 part N,N-distearyl ethylene diamine. Only the anti-fog additive system for each film formulation was changed so that a more accurate comparative analysis of the effectiveness of each anti-fog additive system employed could be made.

The results obtained are set forth in Table IV below wherein the film samples are labled "A," "B," "C," "D," and "E" for purposes of identification; the amount of anti-fog additive comprising the anti-fog additive system in each film is set forth in parts per hundred (p.p.h.) based on 100 parts of resin; the anti-fog additive polyoxyethylene (20) sorbitan monooleate is identified as "X" while the anti-fog additive sorbitan monostearate is identified as "Y"; the values listed under the column heading "Average Rating" were obtained in the manner set forth in Table III above.

TABLE IV

| | Anti-fog additive (p.p.h.) | | Anti-fog effect, average clarity rating after— | |
|---|---|---|---|---|
| | X | Y | 3 min. | 10 min. |
| Film sample: | | | | |
| A | 4 | 0 | 3.40 | 2.05 |
| B | 3 | 1 | 2.50 | (¹) |
| C | 2 | 2 | 0.50 | 0.43 |
| D | 1 | 3 | 3.20 | (¹) |
| E | 0 | 4 | 3.30 | 2.60 |

As can be seen from the results set forth in Table IV above, the synergistic effect of the combination of the two anti-fog additives is clearly demonstrated. Each anti-fog additive, when used alone, had only about 20% of the anti-fog effectiveness obtained by a mixture of the two anti-fog additives at the same levels of concentration. Moreover, it can be seen that the most advantageous ratio of the anti-fog additives appears to be 1:1.

EXAMPLE 2

The anti-fog effect of films containing varying amounts of the anti-fog system comprising the combination of the two anti-fog additives was determined. The same procedures were followed as in Example 1 above and the values for the anti-fog effect were derived in the same manner as for Table IV above. The results obtained are set forth in Table V below wherein the film samples were obtained from the same formulations as for Example 1 above except for the amount of anti-fog additives employed as noted in Table V.

TABLE V

| Film sample: | Anti-fog additive (p.p.h.) | | Anti-fog effect, average clarity rating after— | |
|---|---|---|---|---|
| | X | Y | 3 minutes | 10 minutes |
| A | 0.5 | 0.5 | 3.80 | 3.30 |
| B | 1.0 | 1.0 | 2.35 | 0.60 |
| C | 2.0 | 2.0 | 1.05 | 0.43 |

From the results set forth in Table V above, it can be seen that when the total concentration of the anti-fog additives was at 2.0 p.p.h., a definite improvement of the anti-fog characteristics in the film was obtained. However, when the total anti-fog additive concentration was at 1.0 p.p.h., no significant anti-fog effect was obtained after 10 minutes. As is apparent from the results set forth in Table V above, the best anti-fog effect was obtained when the total concentration of anti-fog additives was at 4.0 p.p.h.

EXAMPLE 3

Several plasticized polyvinyl chloride films were extruded from a resin formulation of 100 parts polyvinyl chloride homopolymer having an inherent viscosity of from about 0.8 to 1.4 deciliters per gram; 33 parts dibutyl sebacate; 7 parts epoxidized soybean oil; 1.5 parts of an organometallic (calcium-zinc) type stabilizer; 1.0 parts of an organic chelator; and 0.2 part stearic acid. The anti-fog additive system for each film formulation was changed so that a comparison could be made of the effectiveness of the two anti-fog additives of the invention when used alone or in combination with the total amount of additive remaining constant.

The results obtained are set forth in Table VI below wherein the film samples are labeled "A," "B" and "C" for purposes of identification. The amount of anti-fog additive in each film is set forth in parts per hundred (p.p.h.) based on 100 parts of resin. The anti-fog additive polyoxyethylene (20) sorbitan monooleate is identified as "X" while the anti-fog additive sorbitan monooleate is identified as "Z." The ratings listed under the column headed "Average Clarity Rating" were obtained in the manner set forth in Table III above.

TABLE VI

| Film sample: | Anti-fog additive (p.p.h.) | | Anti-fog effect average clarity rating after 10 minutes |
|---|---|---|---|
| | X | Z | |
| A | 2 | 2 | 0 |
| B | 4 | 0 | 2.0 |
| C | 0 | 4 | 1.9 |

As can be seen from Table VI, the combination of the two anti-fog additives is clearly superior to the use of either one alone even though the total amount of additive is the same in each sample.

EXAMPLE 4

It was demonstrated in Example 2 that a mixture of 1 part per hundred polyoxyethylene (20) sorbitan monooleate and 1 part per hundred sorbitan monostearate is effective as an anti-fog system and, after 10 minutes, had a clarity rating almost approaching that of the anti-fog system comprising a mixture of 2 parts per hundred of each of these additives.

An attempt was made to ascertain whether the use of either of the additives alone, in an amount which would be effective in combination with the other additive, would yield a film displaying good anti-fog properties. To accomplish this, film samples were obtained utilizing the same film formulation as set forth in Example 1 above. However, only one of the anti-fog additives used in Example 1 was present in each sample. The same procedures were followed in ascertaining the average clarity rating and the anti-fog additives identified by X and Y were the same utilized hereinabove in Example 1 and listed in Table IV. The comparative results obtained are set forth below in Table VII.

TABLE VII

| Anti-fog additive (p.p.h.) | | Anti-fog effect, average clarity rating after 10 minutes |
|---|---|---|
| X | Y | |
| 2.0 | 0 | 3.5 |
| 0 | 2.0 | 2.4 |
| 1.0 | 0 | 3.5 |
| 0 | 1.0 | 3.3 |

It can be seen from Table VII above that neither of the additives alone yielded a film having good anti-fog properties. When the ratings given above are compared to those of Samples B and C of Table V, it is apparent that the use of the anti-fog additives in an approximate 1:1 ratio has a synergistic effect in increasing the anti-fog properties of the film. When either of the additives was used alone in a concentration of 1.0 part per hundred ratings of 3.5 and 3.3 were obtained. However, when used together in a concentration of 1 part per hundred of each, a rating of 0.6 was obtained. The addition of a total of 2 parts per hundred of the anti-fog additive in a 1:1 ratio yielded this rating which is far better than the best rating, namely 2.4, obtained upon addition of 2 parts per hundred of either additive alone. From this data it can be seen that the anti-fog effect obtained from these two anti-fog agents is not merely an additive effect but rather is synergistic and quite unexpected.

It should be understood that the plasticizers utilized and set forth herein have been merely by way of illustration. Other plasticizers well known to those skilled in the art can also be employed in lieu of or in combination with the illustrated plasticizers. Exemplary of other plasticizers which can be used are the monomeric ester primary plasticizers which include but are not limited to diphenyl-2-ethylhexyl phosphate, di(2-ethylhexyl)azelate, dioctyl phthalate, triphenyl phosphate, and the like. The monomeric esters of adipic acid and sebacic acid are particularly preferred in the practice of the present invention. Similarly, the so-called "secondary plasticizers" which can be used include the epoxidized fatty acid ester secondary plasticizers such as the glycidal esters of epoxidized fatty acids.

Likewise, other additives to the film composition may include any of the usual stabilizers for polyvinyl chloride films such as for example triphenyl phosphate, nonylphenol, barium, cadmium, calcium and zinc salts of lauric and other fatty acids, and mixtures thereof.

Hence, although the present invention has been described in some detail and with particularity, it should be understood that changes, modifications and alterations can be made therein without departing from the scope and spirit of the invention.

What is claimed is:

1. A method for obtaining a plasticized anti-fog polymeric film which comprises:
   (a) admixing a polyvinyl chloride homopolymer or a polyvinyl chloride copolymer having at least 70 percent by weight vinyl chloride containing from about 20 to about 65 parts by weight per 100 parts polymer of plasticizer comprising a monomeric ester primary plasticizer component and an epoxidized fatty acid ester secondary plasticizer component, and from 2.0 to 4.0 parts by weight per 100 parts polymer of an anti-fog additive system comprising polyoxyethylene (20) sorbitan monooleate and sorbitan monostearate in a ratio of about 1:1; and,
   (b) extruding the mixture to obtain an anti-fog polymeric film.

2. The method of claim 1 wherein sorbitan monooleate is used in place of sorbitan monostearate in the anti-fog additive system.

3. The method of claim 1 wherein the plasticized polyvinyl chloride homopolymer has an inherent viscosity of from about 0.8 to about 1.4 deciliters per gram.

4. A plasticized anti-fog polymeric film consisting essentially of:
   (a) a polyvinyl chloride homopolymer or a polyvinyl chloride copolymer containing at least 70 percent by weight vinyl chloride;
   (b) from about 20 to about 65 parts by weight per 100 parts polymer of plasticizer comprising a monomeric ester primary plasticizer component and an epoxidized fatty acid ester secondary plasticizer component; and,
   (c) from 2.0 to 4.0 parts by weight per 100 parts polymer of an anti-fog additive system comprising polyoxyethylene (20) sorbitan monooleate and sorbitan monostearate in a ratio of about 1:1.

5. The anti-fog film of claim 4 wherein sorbitan monooleate is used in place of sorbitan monostearate in the anti-fog additive system.

6. The anti-fog film of claim 4 wherein the plasticized polyvinyl chloride homopolymer has an inherent viscosity of from about 0.8 to about 1.4 deciliters per gram.

7. The anti-fog film of claim 4 wherein the primary plasticizer component is selected from the group consisting of adipate diesters and sebacate diesters.

8. The anti-fog film of claim 4 wherein the secondary plasticizer component is epoxidized soybean oil.

9. The anti-fog film of claim 4 wherein the polymer additionally contains from about 1 to about 4 parts by weight per 100 parts polymer of an organo-metallic stabilizer.

10. The anti-fog film of claim 5 wherein the polyvinyl chloride homopolymer has an inherent viscosity of from about 0.8 to about 1.4 deciliters per gram, contains from about 20 to about 65 parts by weight per 100 parts homopolymer of plasticizer comprising a primary plasticizer selected from the group consisting of adipate diesters, and a secondary plasticizer of epoxidized soybean oil and additionally contains from about 1 to about 7 parts by weight per 100 parts homopolymer of an organometallic stabilizer.

11. A plasticized anti-fog polymeric film consisting essentially of:
   (a) a polyvinyl chloride homopolymer or a polyvinyl chloride copolymer containing at least 70 percent by weight vinyl chloride;
   (b) from about 20 to about 65 parts by weight per 100 parts polymer of plasticizer comprising a primary plasticizer selected from the group consisting of adipate diesters and sebacate diesters, and a secondary plasticizer of epoxidized soybean oil;
   (c) from about 1 to about 7 parts by weight per 100 parts polymer of a mixed stabilizer composition comprising an organic chelator and an organo-metallic calcium-zinc type stabilizer; and
   (d) from 2.0 to 4.0 parts by weight per 100 parts polymer of an anti-fog additive system comprising about equal parts of polyoxyethylene (20) sorbitan monooleate and an additive selected from the group consisting of sorbitan monostearate, sorbitan monooleate and mixtures thereof.

References Cited

UNITED STATES PATENTS

| | | | |
|---|---|---|---|
| 3,479,308 | 11/1969 | Gattenby et al. | 260—31.8 R X |
| 3,561,010 | 7/1971 | Carson | 106—13 X |
| 3,048,266 | 8/1962 | Hackel et al. | 260—45.34 |
| 3,091,597 | 5/1963 | Henriques | 260—31.8 X |
| 3,542,713 | 11/1970 | Gillio-Tos et al. | 260—31.8 R X |
| 3,558,537 | 1/1971 | Hecker et al. | 260—31.8 R X |

LEWIS T. JACOBS, Primary Examiner

U.S. Cl. X.R.

260—31.8 R